Oct. 18, 1966  R. S. KURTENACKER ETAL  3,279,829
CONTAINER FASTENER
Filed Feb. 27, 1964
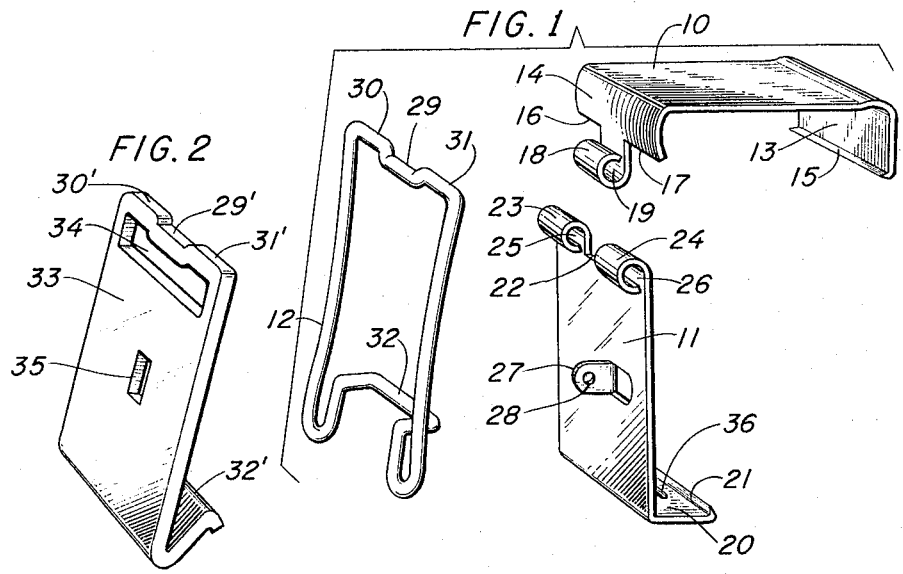
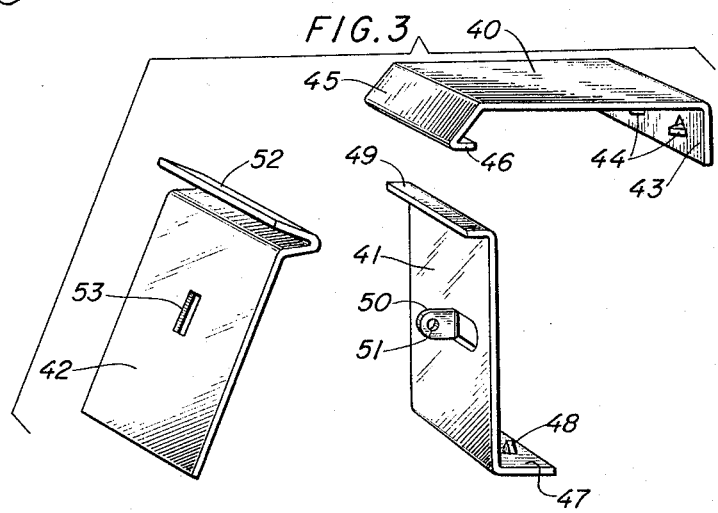
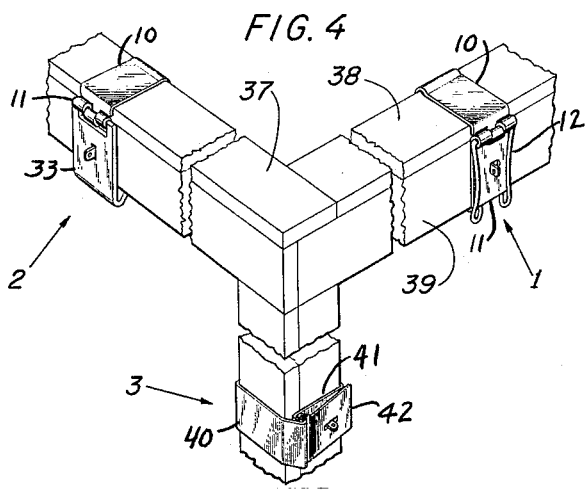
INVENTORS
ROBERT S. KURTENACKER
CHARLES W. ROE
HARRY J. WETZEL
BY
R. Hoffman
ATTORNEY

United States Patent Office 3,279,829
Patented Oct. 18, 1966

3,279,829
CONTAINER FASTENER
Robert S. Kurtenacker, Charles W. Roe, and Harry J. Wetzel, Madison, Wis., assignors to the United States of America as represented by the Secretary of Agriculture
Filed Feb. 27, 1964, Ser. No. 347,962
4 Claims. (Cl. 287—20.92)

A nonexclusive, irrevocable, royalty-free license in the invention herein described throughout the world for all purposes of the United States Government, with the power to grant sublicenses for such purposes, is hereby granted to the Government of the United States of America.

This invention relates to fasteners for joining framed panels to form boxes, and, more particularly, to demountable, reusable box-frame fitting cleats connected by a cammed toggle or bail which may bring the conformable cleats into a tight fitting relationship which is nonseparable until the toggle device is released.

Permanent box fasteners, such as nails, closure plates, edge cleats, and strapping are the common methods for the assembly of frame and panel crates. It is desirable, however, to use nonpermanent fasteners to facilitate storage of such crates while they are not in use. The primary nonpermanent fastener in present use is an L-shaped spring steel wire device with a hook at each end. The hooks fit over the edge framing members of the box and the pressure of the spring steel holds the respective edges of the box together. The device in present use, however, tends to spring off when the box is subjected to a sharp blow. On the other hand, under normal circumstances, the device is rather difficult to remove.

An object of this invention is to provide a reusable, easily demountable, strong box fastener not subject to accidental detachment. These and other objects will be apparent from the description of the invention which follows.

All the embodiments of the instant invention are comprised of three elements: a U-shaped metal cleat shaped to fit conformably over one side and two edges of a box framing member; an L-shaped metal cleat shaped to fit conformably over one side and one edge of a box framing member; and a heavy spring wire, or metal plate toggle, pin, and cam combination; herein styled a "bail."

This invention is capable of receiving a variety of mechanical expressions, several of which, for the purpose of illustrating the invention, are shown in the accompanying drawings, wherein:

FIGURE 1 is a three-dimensional view of a fastener fabricated according to this invention with the elements separated for purposes of illustration;

FIGURE 2 is a similar view of an alternate bail for the fastener depicted in FIGURE 1;

FIGURE 3 is a similar view of another embodiment of this invention; and

FIGURE 4 presents views of the several embodiments of the invention in use.

Referring to FIGURE 1, it may be seen that the invention consists of three separable structures, a double-flanged cleat 10, single-flanged cleat 11, and a bail 12. The double-flanged cleat 10 is designed to fit conformably over one side and two edges of a wood box framing member and as such is formed of a rectangular plate with perpendicular flanges 13 and 14 extending from each end. The flanges may be slightly curved to facilitate installation. Flange 13 is provided with an edge-gripping means such as an angled sharpened edge 15 which provides a secure attachment between the cleat and the wood member when the device is in use. Flange 14 is provided with two peripheral notches 16 and 17, and the central extending edge 18 is outwardly rolled forming receiver 19.

The single-flanged cleat 11 is designed to fit conformably over one side and one edge of a wood box framing member and as such is formed of a rectangular plate with a perpendicular flange 20 extending from one edge. Flange 20 is provided with an edge-gripping means such as the angled, sharpened edge 21 which provides a secure attachment between the cleat and the wood member when the device is in use. The single-flanged cleat 11 is provided with a notch 22 centrally located on the open edge of the cleat; said notch 22 conforms in width to the width of the outwardly rolled extending edge 18 of the double-flanged cleat 10. Extending edges 23 and 24 are outwardly rolled forming receivers 25 and 26. Said extending rolled edges 23 and 24 conform in width to the width of the notches 16 and 17 in the flange 14 of the double-flanged cleat 10. A lock ridge 36 is formed in the under surface of the flange 20. Tooth 27 with opening 28 may be punched out perpendicular in cleat 11 forming a staple for a locking device.

Bail 12 may be formed from heavy-gage wire essentially in the form of a rectangle and is designed to fit removably or unremovably in the receivers 19, 25, and 26 of the double-flanged cleat 10 and the single-flanged cleat 11, respectively, joining them in a relationship such that the rolled extending edge 18 of the double-flanged cleat 10 fits conformably in the notch 22 of the single-flanged cleat 11. A cam device 29 is fabricated in one end of the rectangle such that the wire in the central portion of that end of the rectangle is displaced inwardly forming the camming device. Formation of the camming device leaves peripheral ridges 30 and 31. A strike device 32 is formed in the other end of the rectangle such that the wire in the central portion of that end of the rectangle is displaced inwardly and laterally. The strike device is adjusted so that it latches securely over the lock ridge 36 in the under surface of flange 20 of the single-flanged cleat 11.

FIGURE 2 discloses an alternative form of the bail device 33 which is similar in effect to that disclosed in FIGURE 1 but is formed from a solid sheet of metal or like material. Cam 29′ and ridges 30′ and 31′ are formed in the end of a rectangular piece of sheet metal or like material along with opening 34 which provides for the access of the alternative bail into the receivers 19, 25, and 26 of the respective flanged cleats. Strike device 32′ is formed on the other end of the rectangle such that the alternate bail may be latched securely over the lock ridge, not shown, in the under surface of flange 20 of the single-flanged cleat 11. Alternate bail 33 is also provided with an opening 35 fabricated to fit conformably over tooth 27 of the L-shaped cleat and forming a hasp for a locking device.

The mode of operation of this device is quite simple. The three elements are joined by placing the cam device 29 (or 29′) of the bail into the receiver 19 of the double-flanged cleat 10 and the ridges 30 and 31 (or 30′ and 31′) of the bail into the receivers 25 and 26 of the single-flanged cleat 11. The receivers may then be pinched closed or left open as desired. By the foregoing, it is clear that a simple reversal of parts is possible and either cleat may be formed with the double rolled edge if the other is conformable with the single rolled edge. Referring to FIGURE 4, the combined device may be placed upon the wood frame members 38, the bail rotated toward the single-flanged cleat. This rotation causes the camming action of the bail to bring the cleats into a closer relationship and effecting a secure attachment between the members of the box frame. The strike device 32 and 32′ is then latched over the lock ridge 36 under the flange 20 of the single-flanged cleat 11. A seal may be placed through the opening 28 in the tooth 27 for additional security.

Referring to FIGURE 3, another embodiment of this invention is disclosed, again composed of three elements, an overbearing flanged cleat 40, an underlying flanged cleat 41, and a bail 42. The overbearing flanged cleat 40 is shaped to fit conformably over one side and one edge of a box framing member thus having one perpendicular flange 43 with edge gripping means 44. The other end of the cleat is flanged with a double bend, the first flange 45 forming an obtuse angle with the cleat, and the other flange 46 directed back such that it lies parallel with the body of the cleat and forming an acute angle with flange 45. Cleat 41 is also shaped to fit conformably over one side and one edge of a box framing member, thus having one perpendicular flange 47 with edge gripping means 48. Perpendicular flange 49 lies at the other end of the cleat and is directed opposite to flange 47. Tooth 50 with opening 51 is formed in the body of cleat 41 and forms a staple for the locking device.

The bail 42 is a rectangular plate with one end in the form of a hook 52. The bail 42 is provided with an opening 53 fabricated to fit conformably over tooth 50 of the cleat 41 and forming a hasp for the locking device.

The mode of operation of this embodiment of this invention is also quite simple. Cleats 40 and 41 are placed on the frame members to be joined such that flange 49 of cleat 41 lies between flange 46 and the body of cleat 40. Hook 52 of the bail 42 is then inserted between flange 49 and flange 46. As the bail is rotated toward cleat 41, the camming action of the hook 52 of the bail moves cleat 41 into a closer relationship with cleat 40, thus effecting a secure attachment between the members of the box frame. A seal may be placed through the opening 51 in the tooth 50 for additional security.

FIGURE 4 presents views of the various embodiments of this invention as they would appear in use on a framed crate, a corner of which is shown at 37, formed of framing members 38 and 39. Thus, the device noted by 1 is the device described in FIGURE 1; the device noted by 2 is the device described in FIGURE 1 with the alternate bail described in FIGURE 2; and the device noted by 3 is the device described in FIGURE 3.

It is evident from the above descriptions that the fastener device herein described may provide for the secure closure of framed crates, yet allow for easy demountability and reuse.

We claim:

1. A demountable, reusable closure device for framed containers comprising two frame member gripping structures together conformable in a hinge-like relationship, one of the gripping structures having the central portion of one edge forming an opening, the other gripping structure having the outer portions of one edge forming openings, said gripping structures being interlocked by a bail, one end of said bail passing through the openings in said gripping structures and having a camming portion corresponding to the middle opening in said gripping structures, the other end of said bail terminating in a clasp for removable connection to one of said gripping structures.

2. The device of claim 1 wherein the bail is formed of metal wire of substantial gage.

3. The device of claim 1 wherein the bail is formed of a solid metal plate of substantial gage.

4. A demountable, reusable closure device for framed containers comprising two rectangular cleats each with one edge perpendicularly overhung, said overhang providing a bearing surface for each cleat upon the frame members of a container, the length of each cleat being conformable with the width of the corresponding frame member, the depth of said overhang being conformable to the depth of the corresponding frame member, one of the said cleats having an extending obtusely angled overhang, said extending overhang terminating in a reversely directed lip, the other of said cleats having a perpendicularly extending flange, said flange adapted to lie conformably within the area between the body and the lip of the aforementioned cleat, said related cleats being joined and moveably interrelated by a bail, said bail being a flat rectangular plate with one edge being in the form of a hook along its entire extent, said hook portion of the bail interlocking between the lip of the one cleat and the flange of the other, said hook moving the cleats into a closer relationship by rotation of the bail through a small arc, said closer relationship resulting in a tight fitting secure jointure of the frame members of the container, said secure jointure being demountable and assured by means of a device locking the said bail to the said flange bearing cleat.

References Cited by the Examiner

UNITED STATES PATENTS

| | | | |
|---|---|---|---|
| 2,787,037 | 4/1952 | Hobbs | 20—92.5 |
| 3,191,244 | 6/1965 | Burke | 20—92.4 |

HARRISON R. MOSELEY, *Primary Examiner.*

A. I. BREIER, *Assistant Examiner.*